United States Patent
Werner (10) Patent No.: US 8,113,748 B2
(45) Date of Patent: Feb. 14, 2012

(54) HOLE SAW AND SLUG REMOVER

(76) Inventor: Travis E. Werner, Sherman, TX (US)

( * ) Notice: Subject to any disclaimer, the term of this patent is extended or adjusted under 35 U.S.C. 154(b) by 271 days.

(21) Appl. No.: 12/535,944

(22) Filed: Aug. 5, 2009

(65) Prior Publication Data

US 2010/0086372 A1    Apr. 8, 2010

Related U.S. Application Data (60) Provisional application No. 61/103,364, filed on Oct. 7, 2008.

(51) Int. Cl.
*B23B 51/04*    (2006.01)
(52) U.S. Cl. .................................. 408/68; 408/204
(58) Field of Classification Search .......... 408/204–209, 408/703, 67, 68; *B23B 51/04, 51/05*
See application file for complete search history.

(56) References Cited

U.S. PATENT DOCUMENTS

| | | | | |
|---|---|---|---|---|
| 2,306,807 A | * | 12/1942 | Hulvey et al. | 408/206 |
| 2,433,058 A | * | 12/1947 | Mesaros | 408/68 |
| 2,591,516 A | * | 4/1952 | Darnell | 425/280 |
| 2,754,864 A | * | 7/1956 | Elsy | 408/206 |
| 4,669,927 A | | 6/1987 | Zeller | |
| 4,741,651 A | * | 5/1988 | Despres | 408/209 |
| 4,755,087 A | * | 7/1988 | Parent | 408/68 |
| 5,035,548 A | * | 7/1991 | Pidgeon | 408/68 |
| 5,076,741 A | * | 12/1991 | Littlehorn | 408/68 |
| 5,082,403 A | * | 1/1992 | Sutton et al. | 408/68 |
| 5,096,341 A | * | 3/1992 | Despres | 408/68 |
| 5,435,672 A | * | 7/1995 | Hall et al. | 408/68 |
| 6,641,338 B2 | * | 11/2003 | Despres | 408/204 |
| 2007/0071565 A1 | | 3/2007 | Singh et al. | |

FOREIGN PATENT DOCUMENTS

JP         06079510 A    *    3/1994
WO         WO9604092          2/1996

* cited by examiner

*Primary Examiner* — Daniel Howell
(74) *Attorney, Agent, or Firm* — Stephen C. Beuerle; Procopio Cory Hargreaves & Savitch LLP (57) ABSTRACT

A hole saw with slug remover including a top cylindrical housing; a bottom cylindrical housing attached to the top cylindrical housing, the bottom cylindrical housing having teeth for cutting; a pilot drill extending through the top cylindrical housing and bottom cylindrical housing; a drive screw rotatably affixed to the top cylindrical housing, the drive screw having a threaded exterior; and an ejection plunger engaging the threaded exterior of the drive screw wherein the ejection plunger is forced downward to eject a slug when the drive screw rotates counter-clockwise and is forced upward when the drive screw rotates clockwise.

16 Claims, 10 Drawing Sheets

HOLE SAW AND SLUG REMOVER

RELATED APPLICATION

The present application claims the benefit of U.S. provisional patent application No. 61/103,364 filed Oct. 7, 2008, which is incorporated herein by reference in its entirety.

BACKGROUND

1. Field of the invention

The present invention relates, in general, to hole saws, and, in particular, to hole saws with slug removers.

2. Related Art

Hole saws have been used for many years for the purpose of producing circular apertures at prescribed locations on both planar and curved surfaces. A typical hole saw comprises a cylindrical saw that forms a heavy base end with a threaded axially aligned hole in the bore. The hole saw is usually mounted to a coaxially positioned pilot drill by a mandrel fastened within a hole formed in the top of the hole saw.

The pilot drill extends past the cutting edge of the hole saw so that a pilot hole is cut into the material first before the hole saw begins to remove a circular plug of material from the work piece. The pilot drill thus keeps the hole saw properly positioned while the hole saw starts its cut. This need for positioning by the pilot drill is necessary when the hole saw is used with hand-held drills. Otherwise, during the cutting of hard material, the hole saw has a tendency to walk around the work piece during the sawing of the hole.

While utilizing the hole saw to cut material, it is not uncommon for the portion of material cut therefrom to lodge itself within the cavity defined by the cylindrical walls of the hole saw. The lodged material within the cavity, also known as slug, prevents the hole saw from cutting further holes until it is removed. However, its removal can be a time-consuming activity that may even be dangerous if a user fails to disconnect the drill equipment from its power source. Therefore, time is needlessly spent removing the slug from the cavity of the hole saw.

Depending upon the nature of the material cut, the slug may be hard and compact or soft and loose. Because the material characteristics of the slug often vary, the user may have difficulty removing the slug from the hole saw. Often the material characteristics of the slug causes the slug to become lodged within the hole saw, and in many cases, slug removal must be performed manually. As an aid in the removal, specially-made tools often are utilized.

SUMMARY

An aspect of the invention involves a hole saw with slug remover including a top cylindrical housing; a bottom cylindrical housing attached to the top cylindrical housing, the bottom cylindrical housing having teeth for cutting; a pilot drill extending through the top cylindrical housing and bottom cylindrical housing; a drive screw rotatably affixed to the top cylindrical housing, the drive screw having a threaded exterior; and an ejection plunger engaging the threaded exterior of the drive screw wherein the ejection plunger is forced downward to eject a slug when the drive screw rotates counter-clockwise and is forced upward when the drive screw rotates clockwise.

Another aspect of the invention involves a method of using the hole saw with slug remover described immediately above. The method includes the steps of applying the pilot drill of the hole saw to a piece of material to be cut; rotatably driving the pilot drill and hole saw in a clockwise manner, causing the drive screw to rotate in a clockwise manner and the ejection plunger forced upward, so that a slug is cut out of the piece of material; and rotatably driving the hole saw in a counter-clockwise manner, causing the drive screw to rotate in a counter-clockwise manner and the ejection plunger forced downward to eject the slug.

A further aspect of the invention involves a hole saw with slug remover, the hole saw rotatably driven by a rotatable shaft. The hole saw including a hole saw housing having teeth for cutting; a pilot drill extending through the hole saw housing; an ejection plunger; and an ejection plunger deployment and retraction mechanism operably associated with the hole saw housing, the ejection plunger, and the rotatable shaft so that the ejection plunger is deployed away from the hole saw housing to eject a slug when the rotatable shaft is rotated in first direction and is retracted towards the hole saw housing when the rotatable shaft is rotated in a second direction, opposite of the first direction.

A still further aspect of the invention involves a method of using the hole saw with slug remover described immediately above. The method includes the steps of applying the pilot drill of the hole saw to a piece of material to be cut; rotatably driving the pilot drill and hole saw via the rotatable shaft in the second direction, causing the ejection plunger deployment and retraction mechanism to retract the ejection plunger towards the hole saw housing, so that a slug is cut out of the piece of material; and rotatably driving the pilot drill and hole saw via the rotatable shaft in the first direction, causing the ejection plunger deployment and retraction mechanism to force the ejection plunger downward to eject the slug.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The embodiments of the present invention provide for the automatic removal of the slug lodged in the hole saw. By reversing the rotation of the drill, a ejection plunger protrudes from a portion of the hole saw, dislodging the slug and forcing it therefrom. After the slug is ejected from the hole saw via the ejection plunger, the hole saw can be used, without any further time delay, for additional cutting.

Figure 1A:
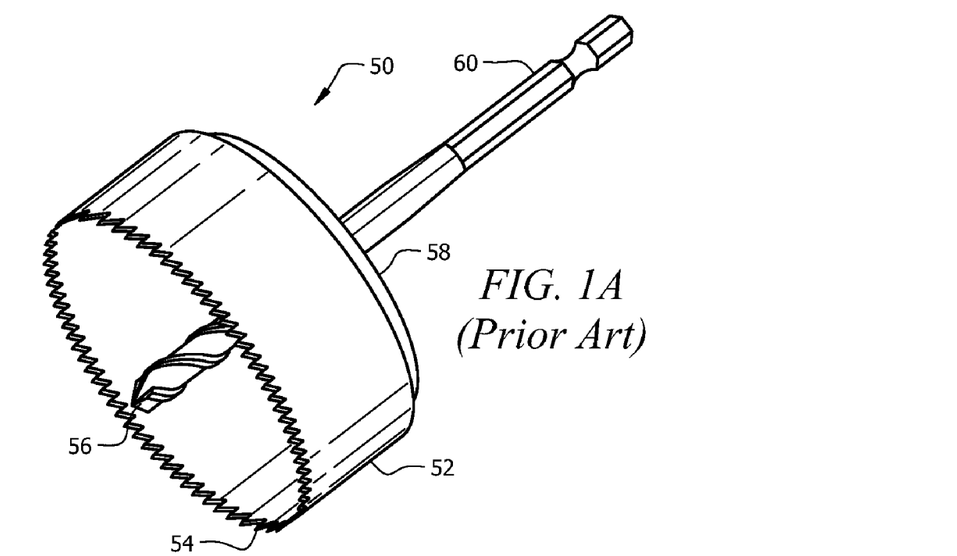
FIG. 1A is a perspective view of a hole saw as exhibited in the prior art.
Figure 1B:
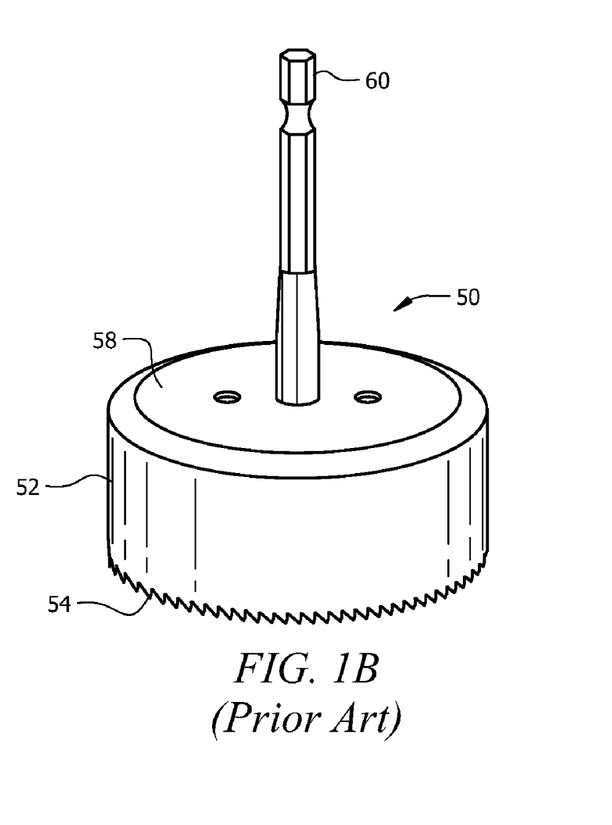
FIG. 1B is another perspective view of a hole saw exhibited in the prior art.

Turning to FIGS. 1A and 1B, a perspective view of a hole saw 50 comprising the prior art can be seen. As shown, a hole saw 50 of the prior art typically is comprised of a cylindrical body 52 having a closed end 58 and an open end 54, the open end 54 having a series of teeth for cutting into material. A shaft 60 is coupled to the closed end 58 of the cylindrical body 52. Additionally, a pilot drill 56 is coupled to the closed end 58 of the interior of the cylindrical body 52 and protrudes therefrom toward the open end 54, extending slightly beyond the teeth.

When the hole saw 50 cuts into material slug becomes lodged in the cavity defined by the exterior walls of the cylindrical body 52. It can be a tedious and time consuming activity to remove the slug from the hole saw 50.

Figures 2, 3:
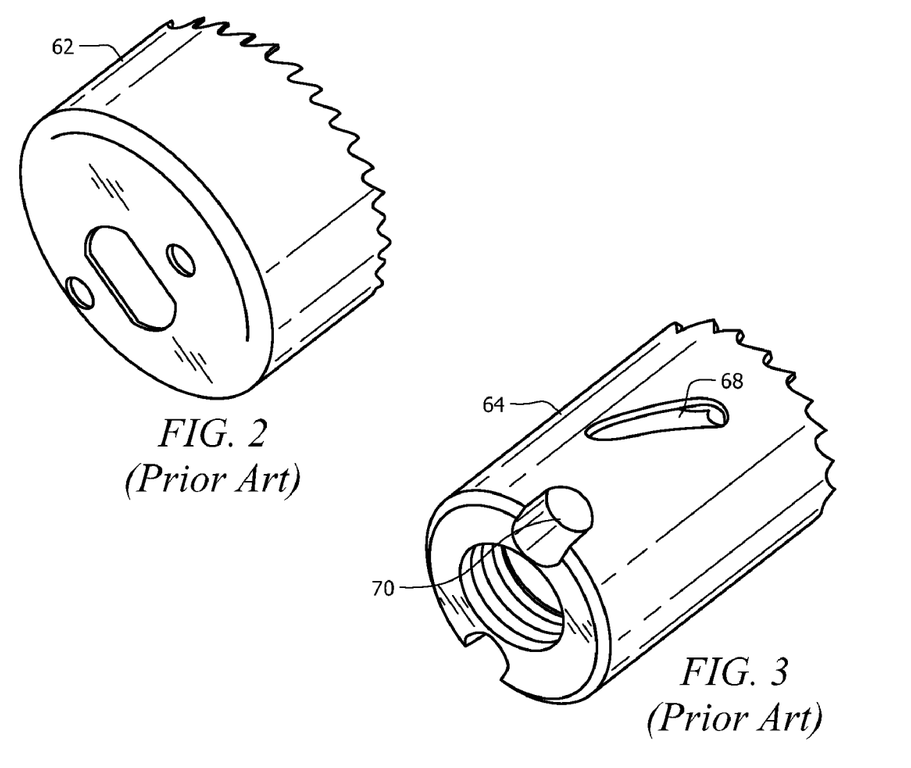
FIG. 2 is a perspective view of a cylindrical housing of a hole saw as exhibited in the prior art.
FIG. 3 is a perspective view of a cylindrical housing of a hole saw as exhibited in the prior art wherein the cylindrical housing comprises an orifice and slit for removing a slug therefrom.
Figure 4:
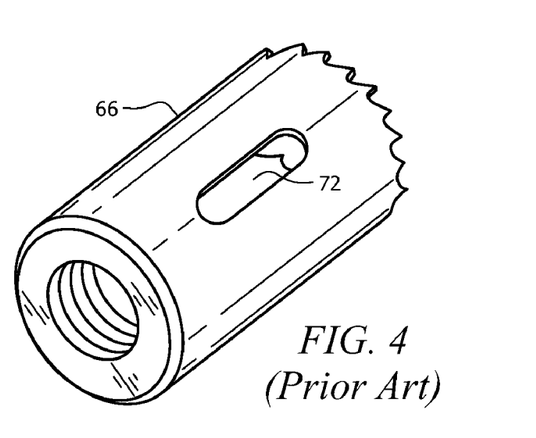
FIG. 4 is a perspective view of a cylindrical housing of a hole saw as exhibited in the prior art wherein the cylindrical housing comprises a slit for removing a slug therefrom.

FIGS. 2-4 comprise perspective views of various cylindrical bodies 62, 64, 66 of a hole saw as used in the prior art. FIG. 2 illustrates a cylindrical body 62 which comprises no design or feature easily allowing a user to remove the slug therefrom. As such, the user must forcibly remove the slug from the cylindrical body 62 through its open end. FIG. 3 illustrates a cylindrical body 64 comprising a slit 68 and orifice 70, and FIG. 4 illustrates a cylindrical body 66 comprising a slit 72, thereby allowing a user to insert an instrument through the respective openings to forcibly remove a slug.

Figure 5:
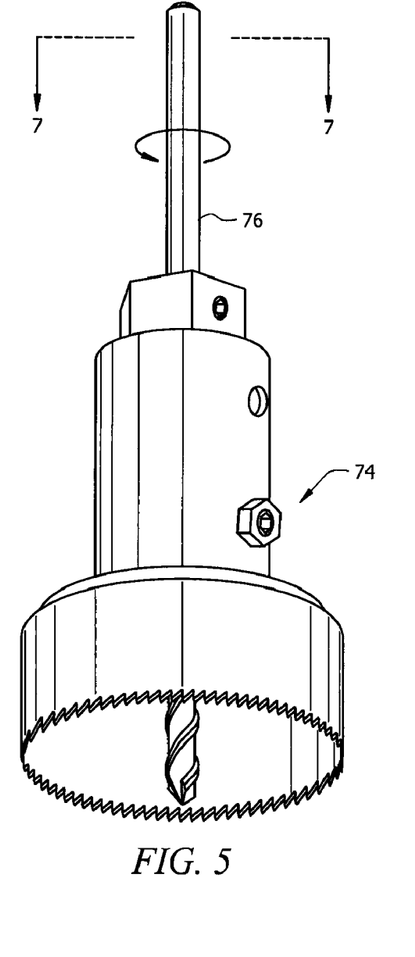
FIG. 5 is a perspective view of an embodiment of the hole saw of this present invention wherein the hole saw is in a ready state for cutting.
Figure 6:
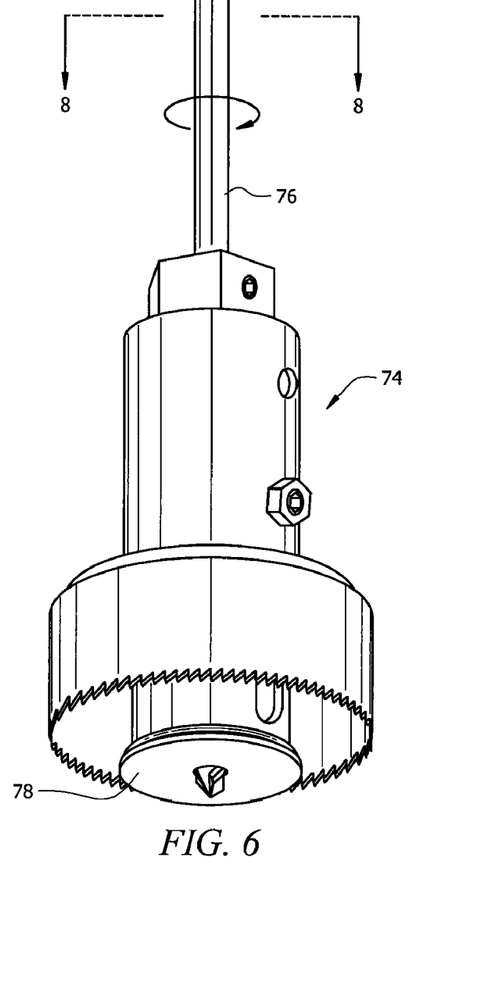
FIG. 6 is a perspective view of an embodiment of the hole saw of this present invention wherein an ejection plunger protrudes therefrom to dislodge and eject slug.

FIGS. 5 and 6 comprise perspective views of an embodiment of the present invention. FIG. 5 illustrates a hole saw 74 in a ready state for cutting. A shaft 76 coupled to the hole saw 74 rotates in a clockwise direction, thereby rotatably engaging the teeth of the hole saw 74 with material to be cut. FIG. 6 illustrates the hole saw 74 ejecting a slug. The shaft 76 coupled to the hole saw 74 rotates in a counter-clockwise direction, thereby causing an ejection plunger 78 to dislodge and eject a slug.

Figure 7:
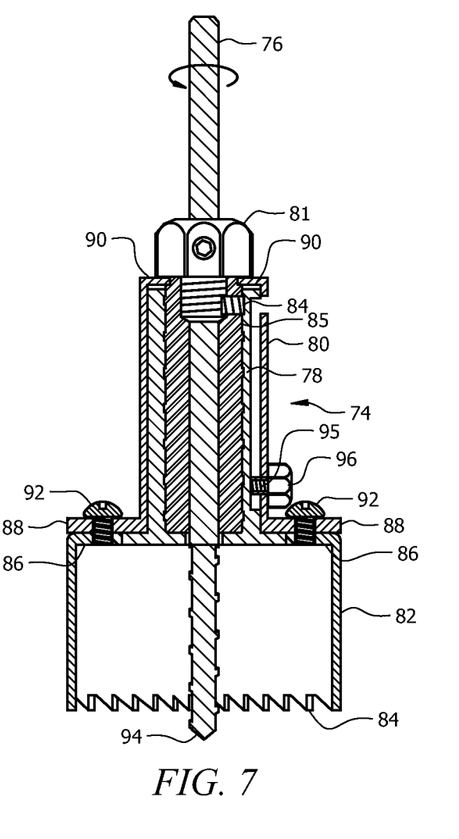
FIG. 7 is a cross-sectional view of FIG. 5.
Figure 8:
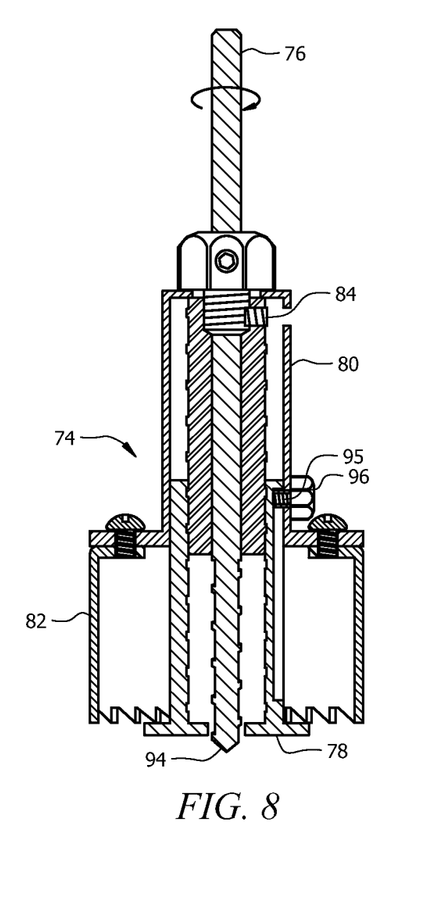
FIG. 8 is a cross-sectional view of FIG. 6.

As shown in FIGS. 7 and 8, the hole saw 74 comprises a top cylindrical housing 80 and bottom cylindrical housing 82 that together form a hole saw housing. The bottom cylindrical housing 82 comprises a plurality of cutting teeth 84 at a first end and an opening defined by shoulders 86 at a second end. The top cylindrical housing 80 comprises an opening at each end defined by shoulders 88, 90. The shoulders 86 of the bottom cylindrical housing 82 are affixed to the shoulders 88 of the top cylindrical housing 80 via a screw 92, however, other means of affixation can be utilized.

An ejection plunger deployment and retraction mechanism of the hole saw 74 will now be described.

The top cylindrical housing 80 houses a drive screw 85 and ejection plunger 78. Additionally, the top cylindrical housing 80 houses a pilot drill 94 protruding therefrom wherein the pilot drill 94 fastens to a nut 81 disposed at the top cylindrical housing 80. Set screw 87 secures the drive screw 85 to the nut 81.

When the ejection plunger 78 abuts the shoulders 90 of the top cylindrical housing 80 and the drive screw 85 rotates in a clockwise direction, the top cylindrical housing 80 and bottom cylindrical housing 82 rotate. Because the top cylindrical housing 80 fastens to the bottom cylindrical housing 82, rotation of either housing causes the other housing to rotate, thereby allowing the plurality of cutting teeth 84 to cut into material.

The drive screw 85 comprises a threaded exterior which engages a threaded interior of the ejection plunger 78. If the drill rotates in a clockwise direction, the drive screw 85 rotatably engages the ejection plunger 78, forcing it upward. The ejection plunger 78 continues its upward motion until impeded by the shoulders 90 of the top cylindrical housing 80. When the ejection plunger 78 upward movement is impeded by the shoulders 90, the ejection plunger 78 rotates. The shoulders protruding from the bottom section of the ejection plunger 78 engage the shoulders 86 of the bottom cylindrical housing 82, thereby creating torque on the bottom cylindrical housing 82 and rotating the bottom cylindrical housing 80 and top cylindrical housing 82.

However as shown in FIG. 8, if the drill rotates in a counter-clockwise direction, the drive screw 85 engages the ejection plunger 78, forcing it downward. As such, the ejection plunger 78 protrudes from the top cylindrical housing 80 through the bottom cylindrical housing 82, thereby dislodging and ejecting a slug contained therein. The rotation of the drive screw 85 drives the ejection plunger 78 further downward until set screw 95 prevents further downward protrusion. Additionally, the top cylindrical housing 80 comprises a locknut 96 fastened thereto, thereby securing set screw 95.

Figure 9:
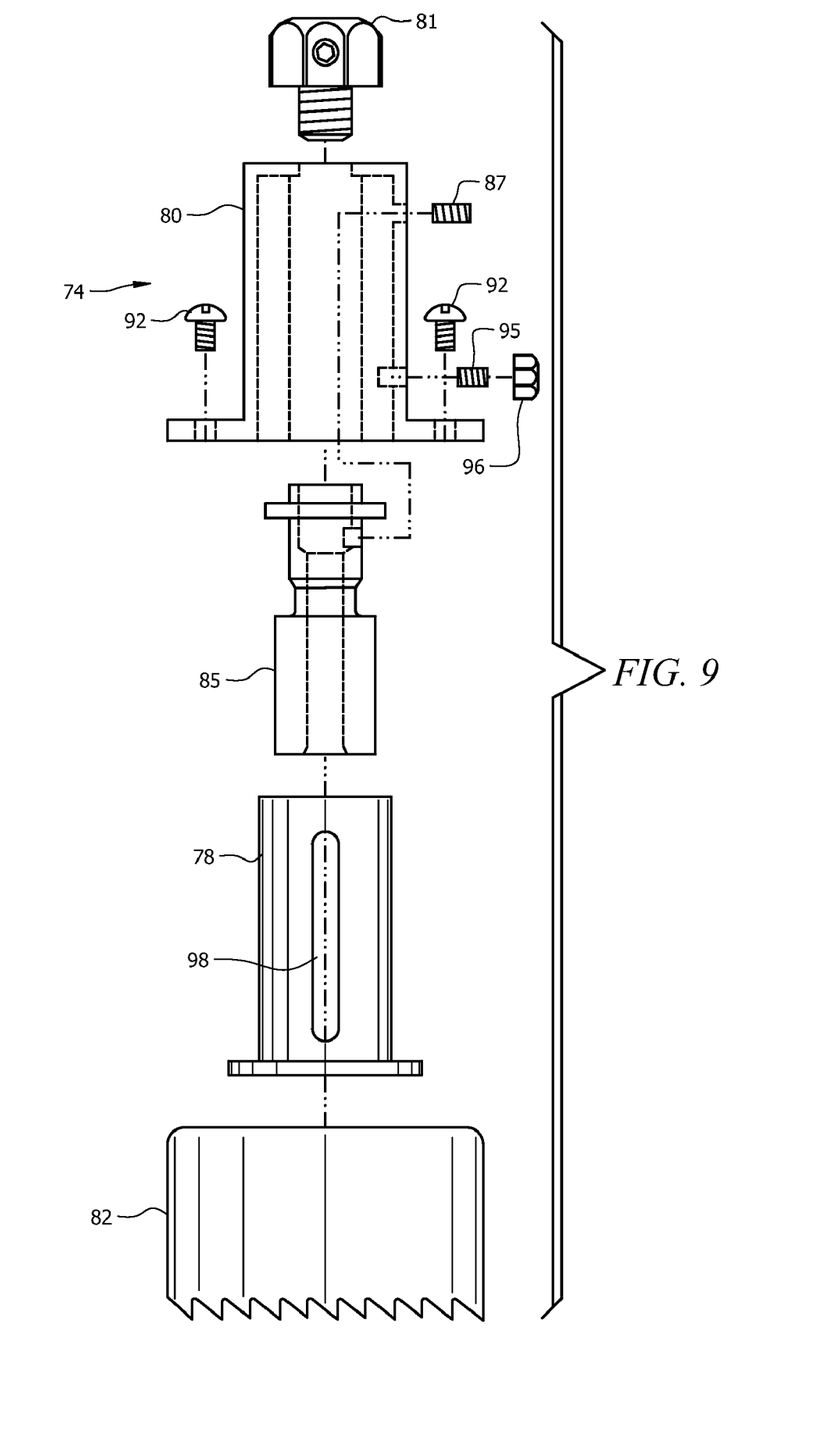
FIG. 9 is an exploded view of an embodiment of the hole saw of this present invention.
Figure 10:
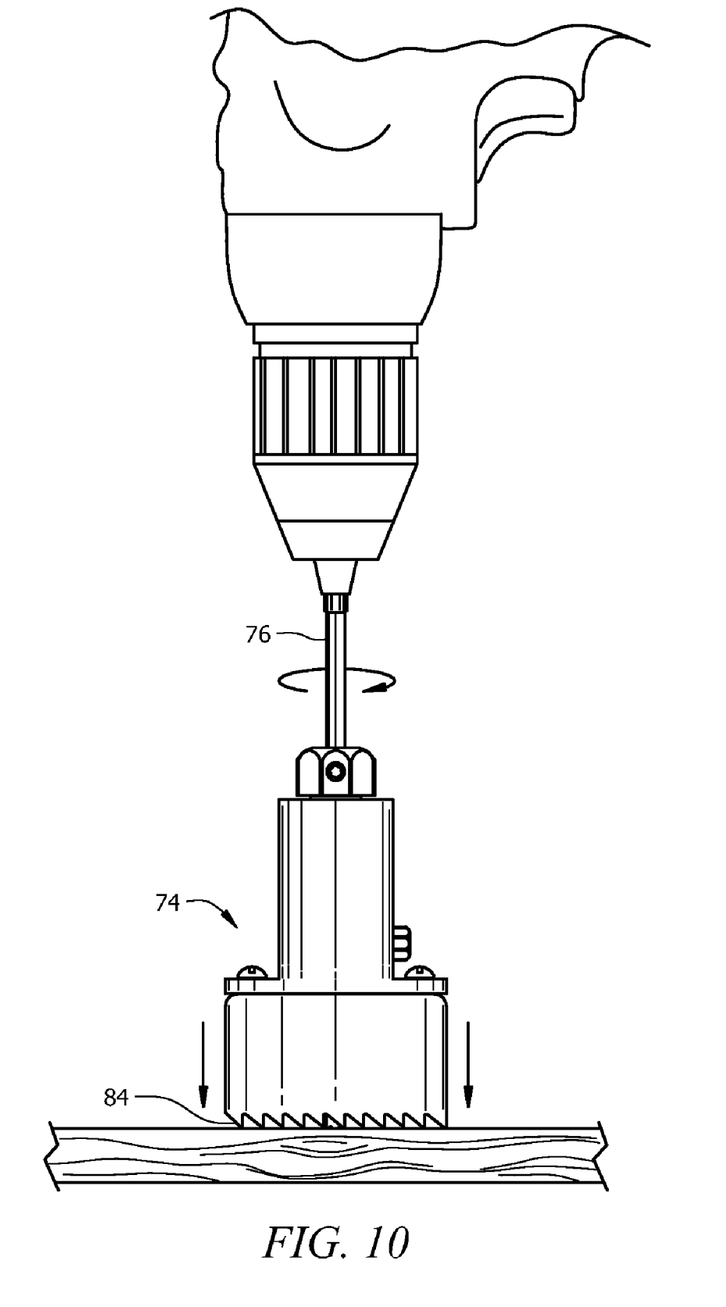
FIG. 10 is a side elevation view of an embodiment of the hole saw as exhibited in this present invention in a ready state of cutting a hole.
Figure 11:
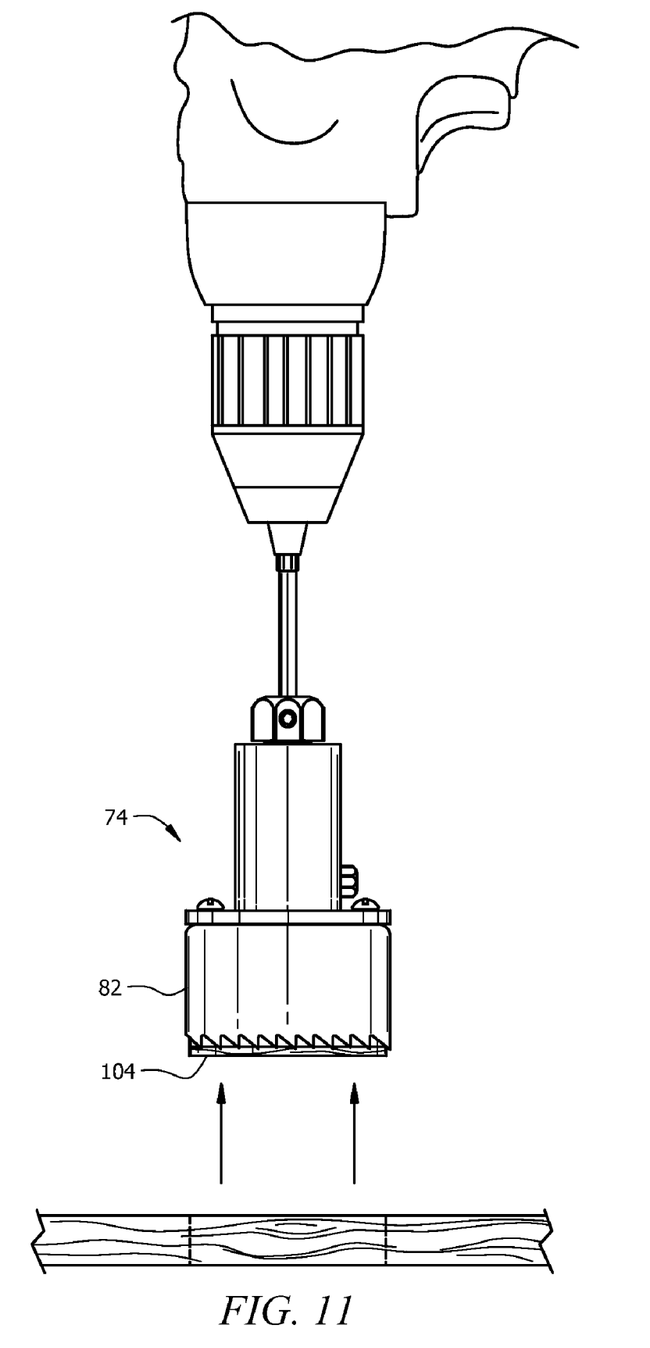
FIG. 11 is a side elevation view of an embodiment of the hole saw exhibited in this present invention wherein the hole saw has a slug lodged therein.
Figure 12:
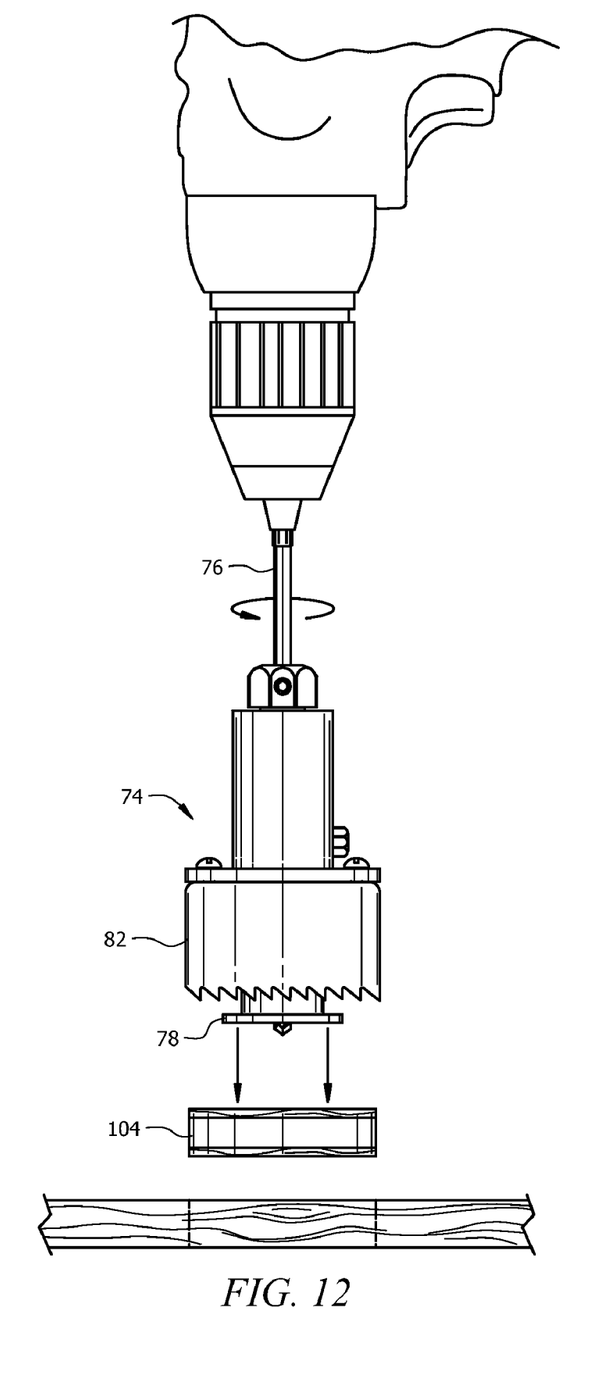
FIG. 12 is a side elevation view of an embodiment of the hole saw exhibited in this present invention wherein the hole saw dislodges and ejects a slog therefrom.

FIG. 9 illustrates an exploded view of the hole saw 74. As can be seen therein, the ejection plunger 78 comprises a slit 98 which allows set screw 95 to slidably engage therewith. Therefore as the ejection plunger 78 advances or retracts, set screw 95 slidably engages the slit 98. When reaching a predetermined protruding length when the drill is in counter-clockwise rotation, the downward motion of the ejection plunger 78 is impeded by set screw 95. Set screw 95 obstructs downward movement beyond a predetermined length when the second set screw 95 abuts the ejection plunger 78 at the end of the slit 98.

With reference to FIGS. 13-17C, another embodiment of a hole saw 174 of the present invention will be described. The hole saw 174, and the operation of the hole saw 174, is generally similar to the hole saw 74 described above with respect to FIGS. 5-12 so only those features that are different from the hole saw 74 will be described. Similar elements will be identified with like references numbers, but with an "A" suffix. The description of the hole saw 74, and especially the similar elements and their operation, is incorporated herein.

Figure 13:
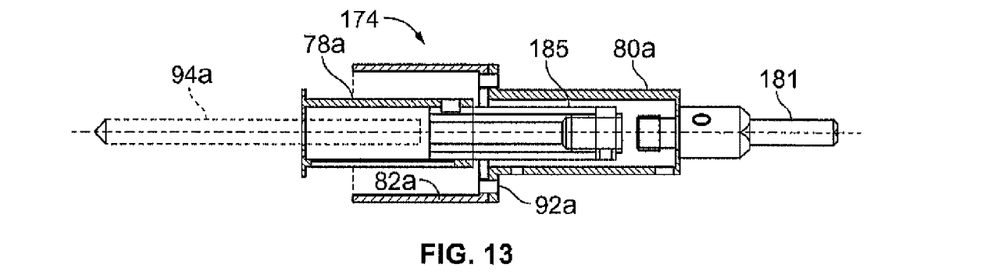
FIG. 13 is a side elevation view of another embodiment of a hole saw of the present invention.

One of the differences of the hole saw 174 is that instead of single drill bit comprised of a shaft 76 and the pilot drill 94 where the chuck of a drill motor chucks onto the shaft 76 of the drill bit, a separate drive shaft 181 is provided with the hole saw 174 to allow for larger diameter holes where more torque is required to be imparted from the drill to the hole saw.

Figure 14A:
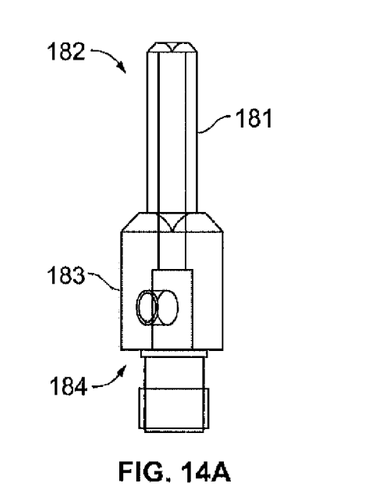
FIGS. 14A, 14B, and 14C are a side elevational view, a top plan view, and a bottom plan view of a drive shaft of the hole saw illustrated in FIG. 13.
Figure 14B:
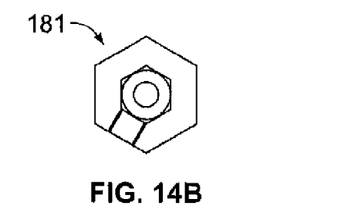
Figure 14C:
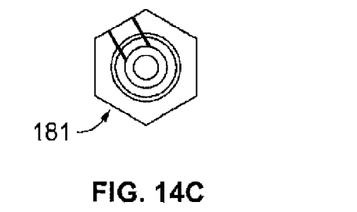

FIGS. 14A, 14B, and 14C are a side elevational view, a top plan view, and a bottom plan view of the drive shaft 181 of the hole saw 174. The drive shaft 181 includes an upper shaft portion 182 with a hexagonal exterior that the chuck of a drill motor chucks onto, a main body 183 with a hexagonal exterior, and a lower shaft portion 184 with a hexagonal exterior. The lower shaft portion 184 is received by a top portion 186 of the drive screw 185. The main body 183 includes a lateral hole for receiving a set screw for securing a top of the shaft of the pilot drill 94a to the drive shaft 181.

Figure 15A:
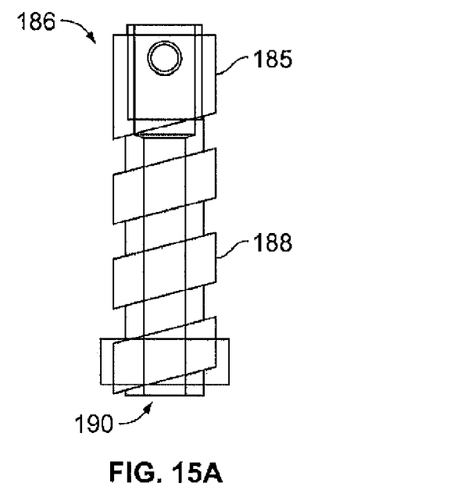
FIGS. 15A, 15B, and 15C are a side elevational view, a top plan view, and a bottom plan view of a drive screw of the hole saw illustrated in FIG. 13.
Figure 15B:
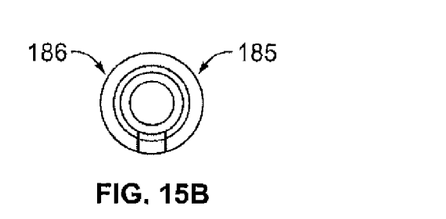
Figure 15C:
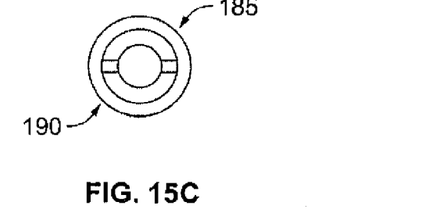

FIGS. 15A, 15B, and 15C are a side elevational view, a top plan view, and a bottom plan view of the drive screw 185 of the hole saw 174. The top portion 185 of the drive screw 185 includes a recess that receives the lower shaft portion 184 of the drive shaft 181. A lateral hole extends through the top portion 185 and receives a fastener (e.g., set screw) for securing the top cylindrical housing 80a, the drive screw 185, and the drive shaft 181 together. An exterior of the drive screw 185 includes exterior threads 188 with a configuration that makes them ideal for production. The exterior threads 188 are square threads and are oriented at a 15 degree angle relative to horizontal. A bottom portion 190 of the drive screw 185 includes screw driver slots.

Figure 16A:
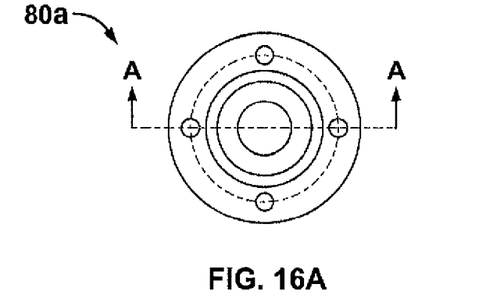
FIGS. 16A, 16B, and 16C are a top plan view, a cross-sectional view (taken along line A-A of FIG. 16A), and a right elevational view of a top cylindrical housing of the hole saw illustrated in FIG. 13.
Figure 16B:
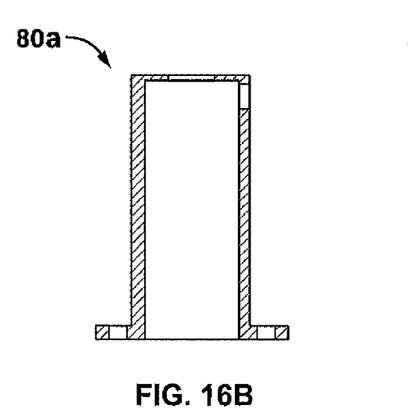
Figure 16C:
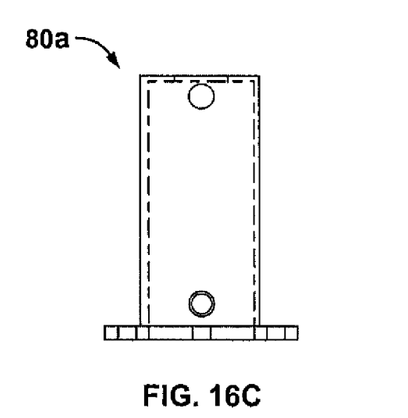

FIGS. 16A, 16B, and 16C are a top plan view, a cross-sectional view (taken along line A-A of FIG. 16A), and a right elevational view of a top cylindrical housing 80a of the hole saw 174.

Figure 17A:
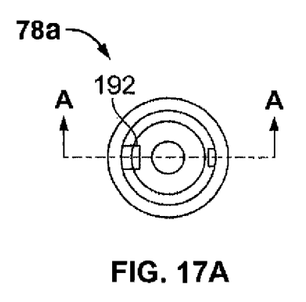
FIGS. 17A, 17B, and 17C are a top plan view, a cross-sectional view (taken along line A-A of FIG. 17A), and a right elevational view of an ejection plunger of the hole saw illustrated in FIG. 13.
Figure 17B:
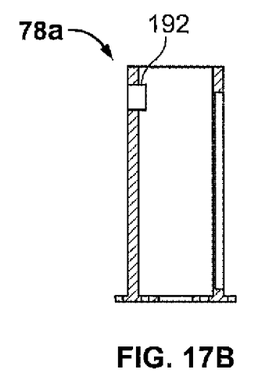
Figure 17C:
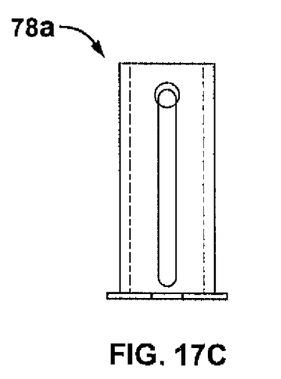

FIGS. 17A, 17B, and 17C are a top plan view, a cross-sectional view (taken along line A-A of FIG. 17A), and a right elevational view of an ejection plunger 78a of the hole saw 174. Instead of being internally threaded like the ejection plunger 78 shown and described above, the ejection plunger 78a includes a rider 192 that is slidably disposed in the recessed portion of exterior threads 188 to enable the ejection plunger 78a to move up and down in the manner described above as the drive screw rotates clockwise and counter-clockwise.

The hole saw 174 is advantageous in that the hole saw 174, and especially, the drive screw 185, is more producible in production than the hole saw 74. Also, the hole saw 174, because of the addition of the drive shaft 181, allows larger diameter hole saws, which require increased torque, to be used than the hole saw 74.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in any claims that may follow, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof, and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A hole saw with slug remover, comprising:
   a top cylindrical housing;
   a bottom cylindrical housing attached to the top cylindrical housing, the bottom cylindrical housing having teeth for cutting;
   a pilot drill extending through the top cylindrical housing and bottom cylindrical housing;
   a drive screw rotatably affixed to the top cylindrical housing, the drive screw having a threaded exterior; and
   an ejection plunger engaging the threaded exterior of the drive screw wherein the ejection plunger is forced downward to eject a slug when the drive screw rotates counter-clockwise and is forced upward when the drive screw rotates clockwise.

2. The hole saw with slug remover of claim 1, wherein the bottom cylindrical housing includes the teeth for cutting at a first end and an opening defined by shoulders at a second end.

3. The hole saw with slug remover of claim 2, wherein the top cylindrical housing includes an opening at a first end defined by shoulders and an opening at a second end defined by shoulders, and the shoulders of the bottom cylindrical housing are affixed to the shoulders at the first end of the top cylindrical housing.

4. The hole saw with slug remover of claim 1, wherein the top cylindrical housing houses the drive screw, the ejection plunger, and the pilot drill, and the hole saw further comprising a nut at the second end of the cylindrical housing and a set screw securing the drive screw to the nut.

5. The hole saw with slug remover of claim 1, wherein the drive screw includes a threaded exterior and the ejection plunger includes a threaded interior that engages the threaded exterior of the drive screw.

6. The hole saw with slug remover of claim 5, wherein the drive screw and the ejection are plunger configured so that rotation of the drive screw in a clockwise direction causes to the ejection plunger to be forced upward and rotation of the drive screw in a counter-clockwise direction causes the ejection plunger to be forced downward to eject a slug.

7. The hole saw with slug remover of claim 6, wherein the hole saw configured so that rotation of the drive screw in a clockwise direction causes the ejection plunger to be forced upward until impeded by the top cylindrical housing, creating torque on the bottom cylindrical housing and the top cylindrical housing, rotating the bottom cylindrical housing and top cylindrical housing.

8. The hole saw with slug remover of claim 6, wherein the hole saw configured so that rotation of the drive screw in a counter-clockwise direction causes the ejection plunger to be forced downward, dislodging and ejecting a slug from the bottom cylindrical housing.

9. The hole saw with slug remover of claim 8, wherein the ejection plunger includes a slit and the upper cylindrical housing includes a set screw slidably received in the slit of the ejection plunger, and counter-clockwise rotation of the drive screw drives the ejection plunger downward until set screw prevents further downward movement of the ejection plunger.

10. The hole saw with slug remover of claim 9, wherein the top cylindrical housing includes a locknut securing the set screw to the top cylindrical housing.

11. The hole saw with slug remover of claim 9, wherein the slit includes a top end and the set screw obstructs downward movement beyond a predetermined length when the set screw abuts the ejection plunger at the top end of the slit.

12. The hole saw with slug remover of claim 1, further including a drive shaft coupled to the top cylindrical housing, the pilot drill, and the drive screw to impart rotation from a chuck of a drill motor to the hole saw and enable larger diameter hole saws to be used.

13. The hole saw with slug remover of claim 1, wherein the drive screw includes a square thread exterior threading.

14. The hole saw with slug remover of claim 13, wherein the exterior threading has a 15 degree angle relative to horizontal.

15. A method of using the hole saw with slug remover of claim 1, comprising:
   applying the pilot drill of the hole saw to a piece of material to be cut;
   rotatably driving the pilot drill and hole saw in a clockwise manner, causing the drive screw to rotate in a clockwise manner and the ejection plunger forced upward, so that a slug is cut out of the piece of material;
   rotatably driving the hole saw in a counter-clockwise manner, causing the drive screw to rotate in a counter-clockwise manner and the ejection plunger forced downward to eject the slug.

16. A hole saw with slug remover, the hole saw rotatably driven by a rotatable shaft, comprising:
   a hole saw housing having teeth for cutting;
   a pilot drill extending through the hole saw housing;
   an ejection plunger;
   an ejection plunger deployment and retraction mechanism operably associated with the hole saw housing, the ejection plunger, and the rotatable shaft so that the ejection plunger is deployed away from the hole saw housing to eject a slug when the rotatable shaft is rotated in first direction and is retracted towards the hole saw housing when the rotatable shaft is rotated in a second direction, opposite of the first direction;
   wherein the hole saw includes the rotatable shaft, and the rotatable shaft is a drive shaft separate from the pilot drill and coupled to the top cylindrical housing, the pilot drill, and the drive screw to impart rotation from a chuck of a drill motor to the hole saw and enable larger diameter hole saws to be used.

* * * * *